(No Model.) 2 Sheets—Sheet 1.

H. E. NOTTINGHAM & A. TUCKER.
FRICTION CLUTCH.

No. 502,446. Patented Aug. 1, 1893.

Witnesses_
Levi D. Sargent
M. L. Murray

Inventors_
Henry E. Nottingham
Andrew Tucker
By Geo. J. Murray
Atty.

(No Model.)  2 Sheets—Sheet 2.

H. E. NOTTINGHAM & A. TUCKER.
FRICTION CLUTCH.

No. 502,446. Patented Aug. 1, 1893.

Witnesses.
Ralph C. Enyart
M. L. Murray

Inventors.
Henry E. Nottingham
Andrew Tucker
By Geo. Murray
Atty

UNITED STATES PATENT OFFICE.

HENRY E. NOTTINGHAM AND ANDREW TUCKER, OF CINCINNATI, OHIO.

FRICTION-CLUTCH.

SPECIFICATION forming part of Letters Patent No. 502,446, dated August 1, 1893.

Application filed October 1, 1892. Serial No. 447,475. (No model.)

*To all whom it may concern:*

Be it known that we, HENRY E. NOTTINGHAM and ANDREW TUCKER, citizens of the United States, and residents of Cincinnati, in the county of Hamilton and State of Ohio, have invented certain new and useful Friction-Clutches, of which the following is a specification.

Our invention relates to friction clutches for driving machinery.

Its object is to provide a compact, simple and reliable means to rapidly stop or start the machine, or to change the speed of the machine without stopping it and to make the change without jarring or subjecting the parts to unusual strain. This object we attain by the means illustrated in the accompanying drawings, in connection with which the invention will be first fully described, and then particularly referred to and pointed out in the claims.

Figure 1:
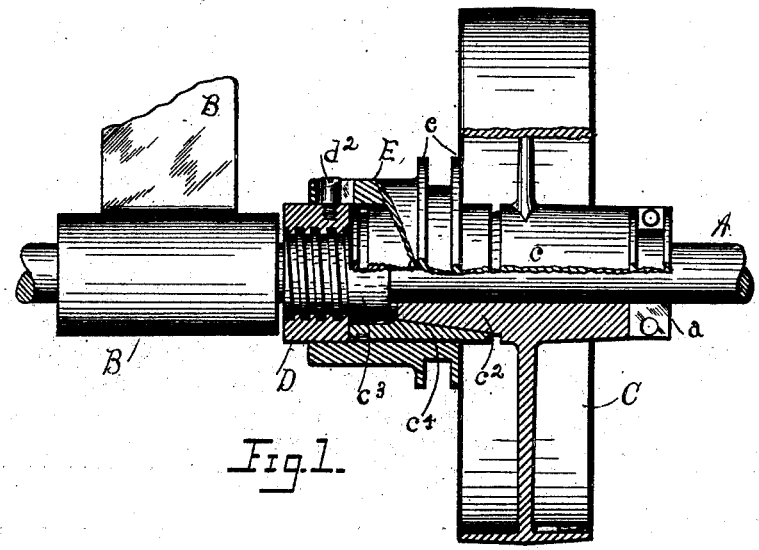
Figure 2:
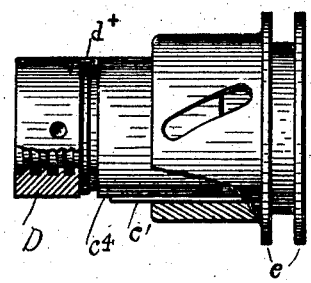
Figure 3:
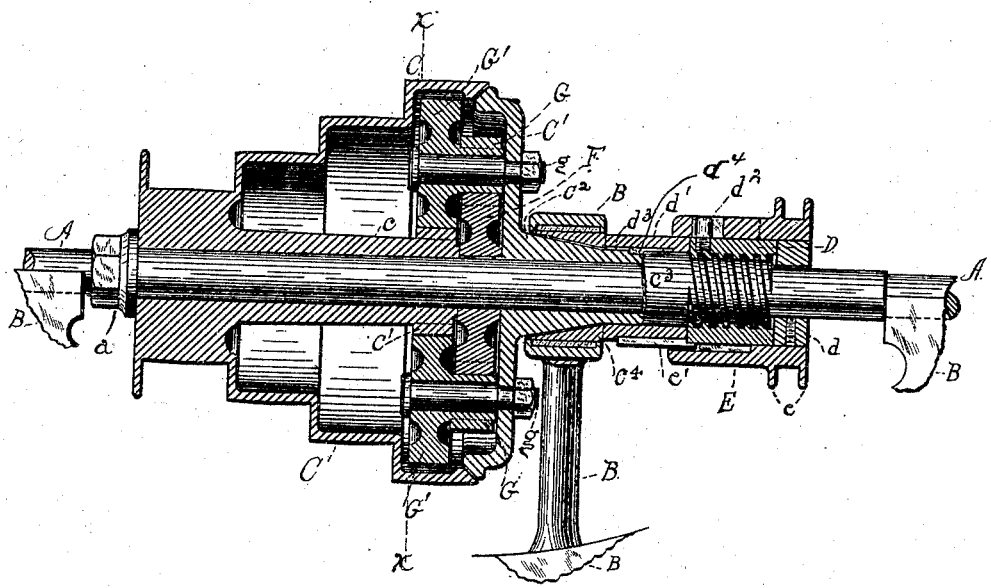
Figure 4:
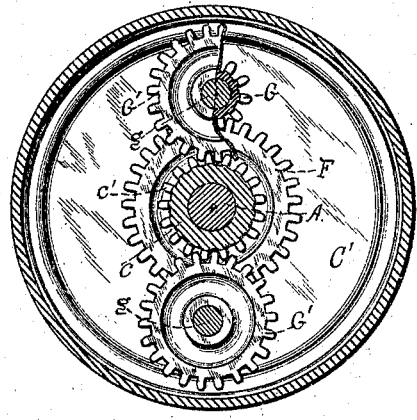
Figure 5:
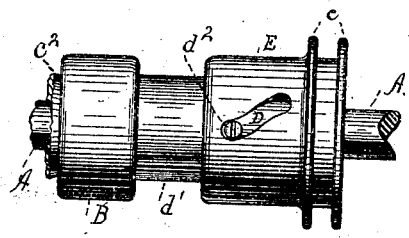

Referring to the drawings, in which like parts are indicated by similar reference letters wherever they occur throughout the various views: Figure 1 is a view partly in longitudinal elevation and partly in section of the simplest form of our invention. Fig. 2 is a similar view of one of the clutch members detached. Fig. 3 is a diametrical sectional view of a lathe head with our improvements applied to it to rapidly change the spindle from the fast to the slow motion. Fig. 4 is a transverse vertical sectional view of the same taken on line $xx$ of Fig. 3, with part of the gears broken away to expose the part back of it. Fig. 5 is a detail view in plan or top elevation of the front part of the head.

Referring first to Figs. 1 and 2, which illustrate our clutch mechanism as applied to a driving pulley: A represents a portion of a shaft or spindle, journaled in bearings B, which may be a hanger or the bearing for the spindle of a lathe, or drill press; C represents a belt pulley loosely journaled upon said shaft; $c^3$ a cylindrical collar terminating in a screw-threaded end, which collar is secured upon the shaft or spindle A, and engages a nut D, the forward end of which bears against a sleeve, $c^4$, which is exteriorly cylindrical and interiorly cone-shaped, counter to the cone-shaped hub, $c^2$, of the pulley C, the two parts forming frictional contact surfaces. E is a sleeve which is fitted to slide longitudinally over the nut D and the sleeve, $c^4$. The sleeves E and $c^4$ are united by a spline, $c'$, which compels the parts to revolve together. The sleeve E has an annular groove formed by the flanges, $e, e$, to receive the forked end of a shifting lever (not shown). The sleeve E has an inclined slot, and to the nut D is secured a pin, $d^2$, which traverses the inclined slot in the sleeve E, partially rotates the nut upon its fixed screw, and compels it to move longitudinally. In its forward movement it bears against the sleeve, $c^4$, and forces it upon the cone hub, $c^2$, of the pulley C, thus coupling the pulley and shaft A. The sleeve, $c^4$, has an annular groove around it near its rear end, which receives the detent of a clip bar, $d^x$, which is secured in a recess in the nut D. By this means the sleeve, $c^4$, and nut D are coupled, so that when the nut is turned backward to release the friction the sleeve, $c^4$, will be also drawn back from the cone hub of the pulley, and quickly relieve the friction. The pulley C is held against longitudinal movement upon the shaft in opposition to the pressure of the sleeve, $c^4$, by a divided collar, $a$, which is clamped upon the shaft against the hub of the pulley C. But a slight motion of the sleeve E is required to couple or uncouple the shaft and band pulley, and so soon as the frictional surfaces come in contact the cone hub turns the sleeves, $c^4$, and E slightly before the motion is imparted to the shaft upon which the screw is secured, and tends to draw the friction sleeve tightly upon the cone hub; consequently, any increased duty placed upon the shaft only tends to tighten the friction, and all slipping is thus prevented.

While our improved means for coupling and uncoupling the contact surfaces of friction clutches are applicable to friction clutches generally, they are especially advantageous in connection with our lathe head for changing the speed of the spindle.

Referring now to Figs. 3, 4 and 5, we will describe our improved lathe head with the friction clutch applied to it. In order to clearly understand our invention it should be understood that the device, precisely as described in connection with Figs. 1 and 2, is applied to the counter shaft of our lathe, and that the principal variation is in the application of the coupling to the friction surfaces, or, to be more specific, in the form just described the female member of the clutch is made movable while in the application of the clutch to our speed changing device the male member is made movable, to force the clutch members together or separate them. The live spindle A, with its connections, is mounted in the head stock B; and upon this spindle is loosely mounted the cone pulley C, as previously described, the enlarged end of which is open. The cone pulley has an interior sleeve, $c$, the inner end of which sleeve terminates in a pinion, $c'$. I prefer to form the pulley, sleeve and pinion integral; but, if desired, the pinion may be made separate and keyed upon the end of the sleeve. The front of the cone pulley is closed when fast speed is employed by a flanged disk $C'$, which has a hub through which the live spindle passes loosely. The inner part, $c^2$, of the hub is cone-shaped exteriorly, while the extended part, $c^3$, is cylindrical, and terminates in a screw-threaded end which engages the nut D, which nut is held from moving longitudinally by a collar, $d$, fixed upon the spindle A, and the sleeve, $d'$, which, as shown, bears against the inner end of the nut, and at the opposite end bears against the interiorly cone-shaped sleeve or bushing, $c^4$, which is fixed in the bearing of the stock. The sleeve E is fitted to slide over the nut D, collar, $d$, and sleeve, $d'$. This sleeve has an inclined slot which is traversed by a pin, $d^2$ which is secured to the nut D. The sleeve E has an annular groove, as previously described, for the shifting lever, by which the sleeve is moved to couple the flanged disk $C'$ and the rim of the cone pulley, when it is desired to make the spindle and cone pulley travel at the same speed, or to uncouple the disk from the rim and couple the hub, $c^3$, and bushing, $c^4$, when the slow speed is desired. The sleeve, $d'$, is coupled to the hub, $c^3$, by a spline, $d^4$, and to the sleeve E by a spline, $e'$; thus when the disk $C'$ is locked to the cone the spindle and all the parts mounted upon it revolve together. Upon the spindle A, within the cone is secured a gear wheel F, which meshes with the pinions G, which pinions are preferably formed integral with gear wheels, $G'$, and are journaled upon studs, $g$, secured diametrically opposite each other in the disk $C'$. The gears $G'$ mesh with the pinion, $c'$, on the inner end of the sleeve, $c$, of the cone pulley. Now, it will be seen, that by shifting the sleeve E in one direction the beveled friction surfaces of the disk and pulley flange are brought together to produce the fast motion; and that by shifting the sleeve in the opposite direction, the cone-pulley is released from the disk, and the cone-portion, $c^2$, of its hub is drawn tightly into the fixed cone bushing, $c^4$, locking the disk, $C'$, against rotation, and while the disk is so locked the pinion, $c'$, drives the gear $G'$ and pinions G, which latter drive the gear F, through which the slow motion is imparted to the spindle.

We claim—

1. The combination, substantially as hereinbefore set forth, of a shaft or spindle, a pulley journaled thereon, and having formed integral with it one member of a friction clutch, the opposite member of said clutch sleeved to slide over said shaft or spindle to couple or uncouple the shaft and pulley, the screw, $c^3$, a nut D, the sliding sleeve E having an inclined slot, and the pin, $d^2$, secured in the nut and projecting into the slot in the sleeve, whereby the nut is partially rotated to couple or uncouple the friction members by sliding the sleeve E.

2. The combination of the spindle A, the pulley C journaled thereon, and having a friction member formed integral with it, the screw, $c^3$, the nut D engaging said screw, the sleeve E having an inclined slot and groove to receive the end of a shifting lever, the pin, $d^2$, secured in the nut and traversing the slot in the sleeve, and the sliding friction member, substantially as shown and described.

3. The combination, in a lathe head, of the spindle, the pulley loosely mounted thereon, the pinion, $c'$, carried by the pulley, the disk $C'$, also mounted upon the spindle, and having a flange adapted to be brought into frictional contact with the edge of the pulley, and an extended hub passing through a fixed friction bearing in the stock, and having its end screw-threaded, the nut engaging the screw on the hub, the collar $d$ fixed upon the spindle, and the sleeve fixed upon the hub to prevent the longitudinal movement of the nut, the pin, $d^2$, secured in the nut, the sliding sleeve E having an inclined slot into which said pin projects, and grooved to receive a shifting lever to slide said sleeve, the gear F, fixed upon the spindle, the stud, $g$, fixed in the friction disk, the pinions and gears, G, $G'$, journaled upon said studs, said gears meshing with the pinions, $c'$, and said pinions meshing with the gear F, substantially as shown and described.

4. The combination in a lathe head of the head stock, the live spindle journaled therein, cone pulley and friction disk loosely mounted upon said spindle, said disk having a cone shaped hub which passes through a fixed bushing in the head, a pinion fixed to the pulley, and a gear fixed upon the spindle within said pulley, the attached pinions and gears journaled upon studs in the friction disk, said gears meshing with the pinion fixed to the cone pulley, and said pinions meshing with the gear fixed upon the spindle, and means such as shown to lock the disk to the pulley or the fixed bushing, for the purpose of varying the speed of the spindle, substantially as hereinbefore set forth.

HENRY E. NOTTINGHAM.
ANDREW TUCKER.

Witnesses:
GEO. J. MURRAY,
RALPH C. ENYART.